US011993394B2

(12) United States Patent
Kathiresan et al.

(10) Patent No.: US 11,993,394 B2
(45) Date of Patent: May 28, 2024

(54) FLIGHT SAFETY DEMONSTRATION AND INFOTAINMENT THROUGH MIXED REALITY

(71) Applicant: Rockwell Collins, Inc., Cedar Rapids, IA (US)

(72) Inventors: Poornima Kathiresan, Bengaluru (IN); Aditya Kumar, Bengaluru (IN); Santhosh Ramamurthy, Bengaluru (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 345 days.

(21) Appl. No.: 17/559,043

(22) Filed: Dec. 22, 2021

(65) Prior Publication Data

US 2023/0146434 A1    May 11, 2023

(30) Foreign Application Priority Data

Nov. 10, 2021  (IN) .............................. 202141051484

(51) Int. Cl.
*G06V 20/00*     (2022.01)
*B64D 11/00*     (2006.01)
(Continued)

(52) U.S. Cl.
CPC .......... *B64D 45/00* (2013.01); *B64D 11/0015* (2013.01); *G06F 3/012* (2013.01);
(Continued)

(58) Field of Classification Search
CPC ............... B64D 45/00; B64D 11/0015; B64D 2045/007; G06F 3/012; G06F 3/147;
(Continued)

(56) References Cited

U.S. PATENT DOCUMENTS 7,936,285 B2 * 5/2011 Kneller ................. H04H 20/62
                                                      340/963
9,547,917 B2    1/2017 Zamer
(Continued)

FOREIGN PATENT DOCUMENTS

EP           2819100 A1 * 12/2014 ........... G06T 19/006

OTHER PUBLICATIONS

Gangabissoon, Tanveer, Girish Bekaroo, and Waseemah Moedeen. "Application of augmented reality in aviation: Improving engagement of cabin crew during emergency procedures training." In Proceedings of the 2nd International Conference on Intelligent and Innovative Computing Applications, pp. 1-8. 2020. (Year: 2020).*
(Continued)

*Primary Examiner* — Van D Huynh
(74) *Attorney, Agent, or Firm* — Suiter Swantz IP (57) ABSTRACT

The present disclosure is generally directed to the use of mixed reality to provide safety information as well as infotainment during flight. Demonstrations of the safety information for the aircraft are augmented in a 3-D way with a virtual representation of the aircraft. The virtual representation provides the safety instructions to the passengers. The mixed reality concept provides the safety information with the help of video-see through mixed reality by way of a head-mounted display worn by the passengers. The safety instructions are provided with a complete working view of locations and operations for the safety jackets, emergency exits, and oxygen passenger service units.

15 Claims, 5 Drawing Sheets

(51) Int. Cl.
*B64D 45/00* (2006.01)
*G06F 3/01* (2006.01)
*G06T 7/73* (2017.01)
*G06T 11/00* (2006.01)
*G06V 10/44* (2022.01)
*G06V 20/40* (2022.01)
*G06V 20/59* (2022.01)
*G06V 40/20* (2022.01)

(52) U.S. Cl.
CPC ............... *G06T 7/73* (2017.01); *G06T 11/00* (2013.01); *G06V 10/44* (2022.01); *G06V 20/46* (2022.01); *G06V 20/59* (2022.01); *G06V 40/28* (2022.01); *G06T 2207/10016* (2013.01); *G06T 2207/30268* (2013.01)

(58) Field of Classification Search
CPC . G06F 3/011; G06T 7/73; G06T 11/00; G06T 2207/10016; G06T 2207/30268; G06T 7/246; G06T 2207/30244; G06V 10/44; G06V 20/46; G06V 20/59; G06V 40/28; G06V 40/161; G09G 2380/12
See application file for complete search history.

(56) References Cited

U.S. PATENT DOCUMENTS

| | | | |
|---|---|---|---|
| 9,646,431 B2 | 5/2017 | Schwartz et al. | |
| 9,728,006 B2 | 8/2017 | Varga | |
| 9,995,936 B1 | 6/2018 | Macannuco et al. | |
| 10,096,166 B2 | 10/2018 | Wright et al. | |
| 10,587,868 B2 | 3/2020 | Yun et al. | |
| 10,803,674 B2 | 10/2020 | Kocharlakota et al. | |
| 10,965,929 B1 | 3/2021 | Bellows et al. | |
| 2010/0238161 A1* | 9/2010 | Varga | G06T 19/006 345/157 |
| 2015/0346722 A1 | 12/2015 | Herz et al. | |
| 2016/0071325 A1 | 3/2016 | Callaghan | |
| 2018/0261186 A1* | 9/2018 | Watson | G06F 9/541 |
| 2019/0197748 A1* | 6/2019 | Vandewall | G06T 11/60 |
| 2019/0221044 A1 | 7/2019 | Motta et al. | |
| 2020/0210127 A1* | 7/2020 | Browy | H04B 7/155 |
| 2020/0357179 A1* | 11/2020 | Michel | B64D 43/00 |
| 2022/0101490 A1* | 3/2022 | Bruder | G06T 19/006 |
| 2023/0334788 A1* | 10/2023 | Zohni | G06F 3/013 |

OTHER PUBLICATIONS

Azuma, Ronald T., Dissertation, "Predictive Tracking for Augmented Reality", University of North Carolina at Chapel Hill, North Carolina, TR95-007, Feb. 1995, 262 pages.

Sobota, Branislav et al., "Mixed Reality: A Known Unknown", IntechOpen, Mixed Reality and Three-Dimensional Computer Graphics, DOI: http://dx.dio.org/10.5772/intechopen.92827, Downloaded Oct. 29, 2021, 17 pages.

* cited by examiner

FLIGHT SAFETY DEMONSTRATION AND INFOTAINMENT THROUGH MIXED REALITY

CROSS-REFERENCE TO RELATED APPLICATIONS

The present application claims the benefit of India Provisional Patent Application 202141051484, filed Nov. 10, 2021, titled FLIGHT SAFETY DEMONSTRATION AND INFOTAINMENT THROUGH MIXED REALITY, naming Poornima Kathiresan, Aditya Kumar, and Santhosh Ramamurthy as inventors, which is incorporated herein by reference in the entirety.

TECHNICAL FIELD

The present invention generally relates to aircraft passenger accommodation, and more particularly to aircraft passenger accommodations provided by mixed reality.

BACKGROUND

Flight attendants may manually demonstrate safety instructions including the location and operation of emergency doors, life jackets, and oxygen passenger service units. In some instances, passengers may have difficulty hearing instructions with respect to position or operation of the life jackets, the emergency doors, and the oxygen passenger service units. Depending upon the height of the flight attendant and the height of the passenger, the passenger may have difficulties viewing the demonstration. The number of such flight attendants may also be limited, such as in domestic flights. In the case of a single cabin crew, the flight attendant may be required to demonstrate the safety instructions at multiple positions along the aircraft, causing minor flight delays. The flight attendant may also demonstrate the safety instructions in a specific language, depending upon the region of the flight. By demonstrating the safety instructions, the flight attendants must also take time which could otherwise be spent by the flight attendant in pre-flight preparations of the aircraft.

Therefore, it would be advantageous to provide one or more of a device, system, or method that cures the shortcomings described above.

SUMMARY

Embodiments of the present disclosure are directed to a computer-implemented method. In one embodiment, the computer-implemented method includes receiving a first video signal and pose information by way of an avionics network. The first video signal is received from a camera of a head-mounted display within an aircraft environment and corresponds to images captured of the aircraft environment. The pose information is received from a head tracker of the head-mounted display. In another embodiment, the computer-implemented method includes detecting a feature vector within the first video signal by digital image processing the first video signal using a feature detector algorithm. The feature vector includes at least a first feature corresponding to an aircraft safety device including one of a life preserver stowage, an oxygen mask passenger service unit, a seatbelt, or an emergency exit door. In another embodiment, the computer-implemented method includes estimating a pose of the aircraft safety device within the first video signal based on the feature vector together with the pose information from the head tracker. In another embodiment, the computer-implemented method includes generating a second video signal of the aircraft environment. The second video signal includes the first video signal and one or more virtual objects composited with the first video signal. The one or more virtual objects correspond to a safety instruction associated with the aircraft safety device. Furthermore, the one or more virtual objects are positioned and oriented within the second video signal from a perspective of the head-mounted display based on the pose of the aircraft safety device. In another embodiment, the computer-implemented method includes causing a display of the head-mounted display to display the second video signal.

Embodiments of the present disclosure are also directed to an aircraft system. In one embodiment, the aircraft system includes a head-mounted display within an aircraft environment. In another embodiment, the head-mounted display includes a frame. In another embodiment, the head-mounted display includes at least one camera fixed to the frame. Then, at least one camera generates a first video signal corresponding to images captured of the aircraft environment. In another embodiment, the head-mounted display includes a head tracker fixed to the frame. The head tracker generates pose information indicative of a position and orientation of the at least one camera. In another embodiment, the head-mounted display includes a display configured to generate an image. The display is fixed to the frame. In another embodiment, the aircraft system includes an avionics network. In another embodiment, the aircraft system includes a processor which is communicatively coupled to the head-mounted display by the avionics network. In another embodiment the processor is configured to execute program instructions maintained on a memory. In another embodiment, the program instructions cause the processor to receive the first video signal and the pose information from the head-mounted display by way of the avionics network. In another embodiment, the program instructions cause the processor to detect a feature vector within the first video signal by digital image processing the first video signal using a feature detector algorithm. In another embodiment, the feature vector includes at least a first feature corresponding to an aircraft safety device including one of a life preserver stowage, an oxygen mask passenger service unit, a seatbelt, or an emergency exit door. In another embodiment, the program instructions cause the processor to estimate a pose of the aircraft safety device within the first video signal based on the feature vector together with the pose information from the head tracker. In another embodiment, the program instructions cause the processor to generate a second video signal by compositing the first video signal with one or more virtual objects corresponding to a safety instruction associated with the aircraft safety device. The one or more virtual objects are positioned and oriented within the second video signal from a perspective of the head-mounted display based on the pose of the aircraft safety device. In another embodiment, the program instructions cause the processor to cause the display of the head-mounted display to display the second video signal.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive "or". For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Mixed reality is generally described in the chapter Mixed Reality: A Known Unknown of the book *Mixed Reality and Three-Dimensional Computer Graphics*, by Branislav Sobota et al. Said chapter Mixed Reality: A Known Unknown is incorporated herein by reference in the entirety.

Mixed reality (MR) is a display technology which has undergone rapid developments, due to advancements in computer vision and the development of image processing algorithms. Mixed reality may include a combination of virtual objects being overlaid onto images from the real world. Such combination requires the synchronization of the real world and the virtual world for providing the overlap. One type of mixed reality is an optical-see through mixed reality system. A second type of mixed reality is a video-see through mixed reality system. In video-see through mixed reality systems, the real world is captured by video cameras. The video cameras capture a stream of images, also referred to as video signals. The images from the video camera are processed and combined with various virtual objects. The combined image and virtual objects are then displayed to a user by way of a display. The images from the camera and the virtual object may also be updated as the video captured by the camera changes (e.g., due to movement of the camera relative to the environment). The display may include some amount of latency between the images seen by the user and the actual state of the real environment due to the images being processed and combined with the virtual objects prior to being displayed to the user.

Referring now to one or more embodiments of the present disclosure. Broadly, a computer-implemented method and an aircraft system implementing the method are described. The computer-implemented method provides for generating video-see through mixed reality in the context of flight safety demonstrations. The mixed reality generated may include displaying a virtual object together with an aircraft safety device. By displaying the virtual object together with the aircraft safety device, a passenger using a head-mounted display may visually determine an actual position of the aircraft safety device. This is in contrast to flight safety demonstrations by a stewardess or a flight safety videos, where the user does not visually see the actual position of the aircraft safety device from the user's current point of view. Additionally, the user may correlate the aircraft safety device with the correct methods of operation. Such correlation may improve the ability of the user to perform the method of operation during an emergency event. For example, the imagery may include the correct method of operating one or more of a life preserver stowage, an oxygen mask passenger service unit, a seatbelt, or an emergency exit door. The head-mounted display may further be used for various infotainment purposes. Each passenger of the aircraft may include one of the head-mounted displays, for providing the flight safety demonstrations.

Figure 1:
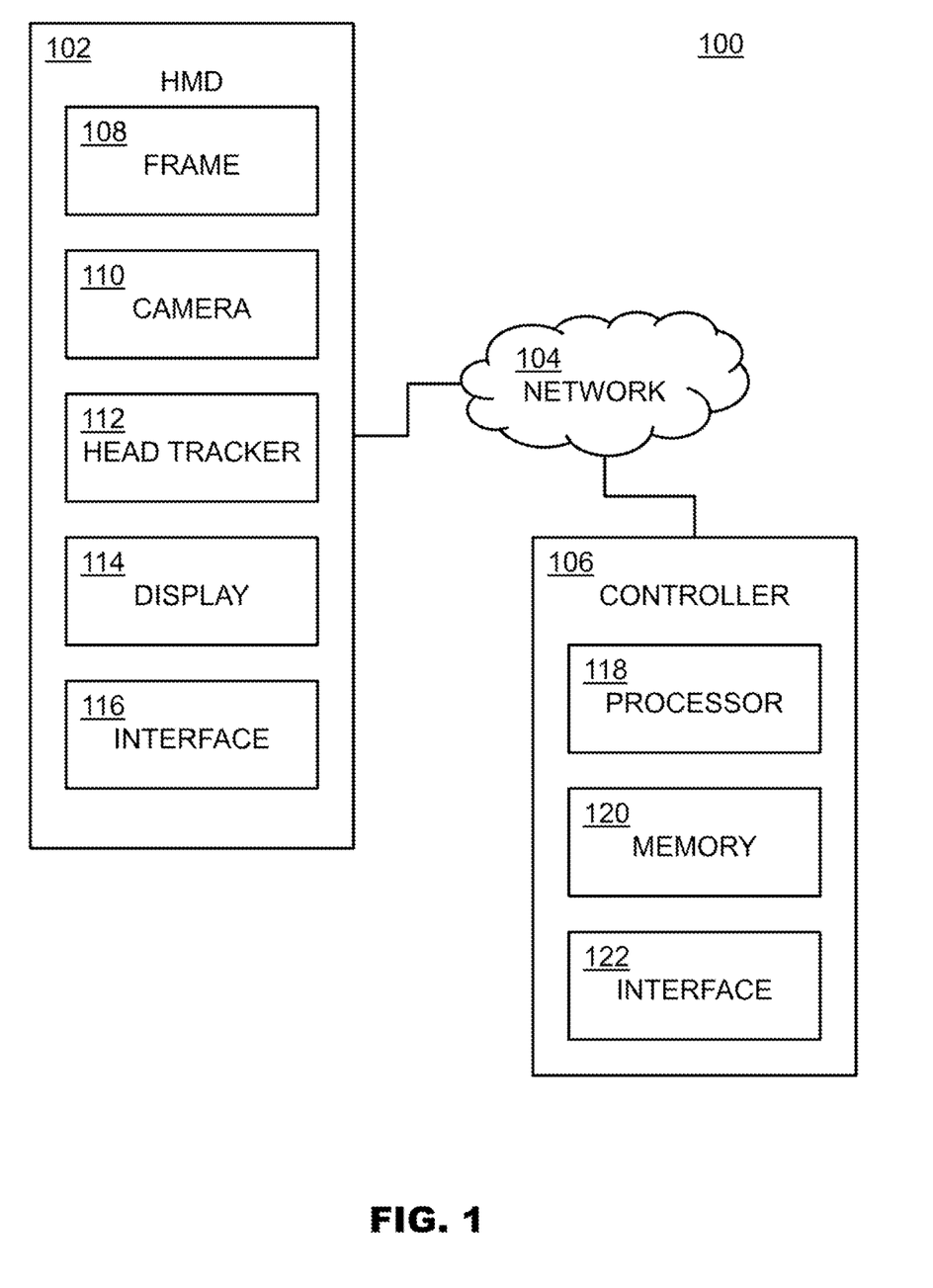
FIG. 1 depicts a simplified schematic diagram of an aircraft system, in accordance with one or more embodiments of the present disclosure.

Referring now to FIG. 1, an aircraft system 100 is described, in accordance with one or more embodiments of the present disclosure. The aircraft system 100 may be embodied within a passenger seat group of an aircraft. The aircraft system 100 may further include various components disposed outside of the passenger seat group, such as, but not limited to, various networking elements and one or more controllers. The aircraft system 100 may include one or more of a head-mounted display 102 (HMD), a network 104, or a controller 106. A pose of the head-mounted display 102 is measured along with a video signal of images captured of the aircraft environment. With the pose and the video signal, the controller 106 may composite a virtual object onto the images, for display to a passenger by the head-mounted display 102 in a video-see through mixed reality manner.

The head-mounted display 102 may be worn by a passenger of an aircraft. While the passenger is wearing the head-mounted display 102, the passenger may gaze at various aircraft safety devices within the aircraft environment, including, but not limited to, a life preserver stowage, a life preserver, an oxygen mask passenger service unit, an oxygen mask, a seatbelt, a fasten seatbelt sign, an emergency exit door, or the like. The head-mounted display 102 of the aircraft system 100 may include a frame 108. The frame 108 may include one or more straps for securing the head-mounted display 102 to a head of a passenger sitting within the aircraft environment. One or more components of the head-mounted display 102 may be fixed or otherwise coupled to the frame, such as, but not limited to, a camera 110, a head-tracker, a display 114, and an interface 116.

The head-mounted display 102 of the aircraft system 100 may include the camera 110. The camera 110 may include any suitable camera, such as, but not limited to, a charge couple device (CCD) detector, a complementary metal-oxide semiconductor (CMOS), or the like. The camera 110 may be fixed to the frame 108, such that the camera 110 is positioned and oriented to capture video signals of the aircraft environment. The camera 110 may also be communicatively coupled to the interface 116. For example, the camera 110 may provide video signals captured by the camera 110 to the interface 116, for subsequent transmission to the controller 106.

The head-mounted display 102 of the aircraft system 100 may include the head tracker 112. The head tracker 112 may generate pose information. As used herein, pose should be understood to include both a position and an orientation. The head tracker 112 may include device known in the art to generate pose information, such as, but not limited to, a gyroscope, an accelerometer, a magnetometer, or an inertial measurement unit. The head tracker 112 may generate the pose information and associate the pose information with images generated by the camera 110. In this regard, a position of the camera at the moment the images were captured may be determined.

The head-mounted display 102 of the aircraft system 100 may include the display 114. The display 114 may include a variety of screen technologies known in the art, such as, but not limited to, a LCD, organic LED, dot matrix display, and others. The display 114 may further include a variety of speaker technology known in the art, such as, but not limited to, speakers, headphones, earpieces, or other electroacoustic transducers. By the speakers, an audio signal portion of the video signal may be output for aural perception by a user of the head-mounted display 102. Although not depicted, the head-mounted display 102 may further include a controller, a processor, or a memory. The processor may execute various display functionality causing the display 114 to display the imagery and audio based on the video signals. In some embodiments, the processor may also execute functions causing the processor to carry out the steps described throughout the present disclosure, such as, but not limited to, the various methods of compositing safety instruction described herein. In some instances, the processor of the head-mounted display 102 may include insufficient processing power to perform one or more of detecting feature vectors or image compositing. In the instance where the processor is incapable of performing such processing tasks, the processing tasks may be performed by a processor which is not co-located within the head-mounted display but is otherwise located on the aircraft (e.g., a line-replaceable unit (LRU) processor, an integrated modular avionics (IMA) cabinet, etc.).

The head-mounted display 102 of the aircraft system 100 may include the network interface 116. The network interface 116 may include any standard interface, such as, but not limited to, ARINC 429, ARINC-664, ethernet, AFDX, serial, CAN, TTP, Military Standard (MIL-STD) 1553, peripheral component interconnect (PCI) express, digital interfaces, analog interfaces, discrete interfaces, or the like. The network interface 116 may be configured to receive data, such as, but not limited to, the video signals from the camera 110 and the position and orientation information from the head tracker 112 for transmission to the controller 106 by way of the network 104. The network interface 116 may further receive various virtual imagery from the network 104, which may then be displayed by the display 114.

The network 104 of the aircraft system 100 may include an avionics network known in the art. For example, the network 104 may include, but is not limited to, ARINC 429 data bus, Ethernet bus, or other data bus. The network 104 may communicatively couple one or more components of the aircraft system 100, such as the head-mounted display 102 and the controller 106.

The controller 106 of the aircraft system 100 may further include one or more processor(s) 118. The processor(s) 118 may include any processing unit known in the art. For example, the processor(s) 118 may include a multi-core processor, a single-core processor, a reconfigurable logic device (e.g., FPGAs), a digital signal processor (DSP), a special purpose logic device (e.g., ASICs)), a central processing unit (CPU), a graphic processing unit (GPU), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processor(s) (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory 120, from firmware, or by hardware implemented functions. It should be recognized that the steps described throughout the present disclosure, such as, but not limited to, the various methods described herein, may be carried out by the processor(s) 118. It is further contemplated that various steps of the processes or methods described herein may be implemented by more than one processor in parallel to improve latency.

The controller 106 of the aircraft system 100 may include a memory 120. The memory 120 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory 120 may be housed in a common controller housing with the one or more processor(s) 118. For example, the memory 120 and the processor(s) 118 may be housed in an integrated modular avionics (IMA) controller, a line replaceable unit (LRU), or the like. In an alternative embodiment, the memory 120 may be located remotely with respect to the physical location of the processor(s) 118. In another embodiment, the memory 120 maintains program instructions for causing the processor(s) 118 to carry out the various steps described through the present disclosure.

The memory 120 may also maintain one or more virtual objects. The virtual objects may include three dimensional virtual objects which show the operation of various aircraft safety devices. The virtual objects may correspond to a safety instruction associated with an aircraft safety device found in the real world. For example, the virtual objects may include one or more of a life preserver stowage, a life preserver, an oxygen mask passenger service unit, an oxygen mask, a seatbelt, a fasten seatbelt sign, an emergency exit door, or the like. Such virtual objects may include three-dimensional models, which may be oriented and viewed from a number of angles.

The memory 120 may also maintain one or more audio safety instructions. The audio safety instructions may include audio which describes the operation of the various aircraft safety devices. For example, the audio may include a pre-recorded description of operating the life preserver, the oxygen mask, the seatbelt, or the emergency exit door. The audio may also include an audio cue or noise associated with the fasten seatbelt sign.

The memory 120 may also maintain a gesture dataset. The gesture dataset may include any number of hand gestures known in the art, such as, but not limited to, pointing, or other gestures which provide a touchless interface. A hand gestures detected within the video signals may then be compared against the gesture dataset, by any classification method known in the art.

The controller 106 of the aircraft system 100 may include a network interface 122. The network interface 122 may be similar to the network interface 116. The network interface 116 may include any standard interface, such as, but not limited to, ARINC 429, ARINC-664, ethernet, AFDX, serial, CAN, TTP, Military Standard (MIL-STD) 1553, peripheral component interconnect (PCI) express, digital interfaces, analog interfaces, discrete interfaces, or the like. The network interface 122 may relay various information between the processor 118 and the head-mounted display 102.

Figure 2:
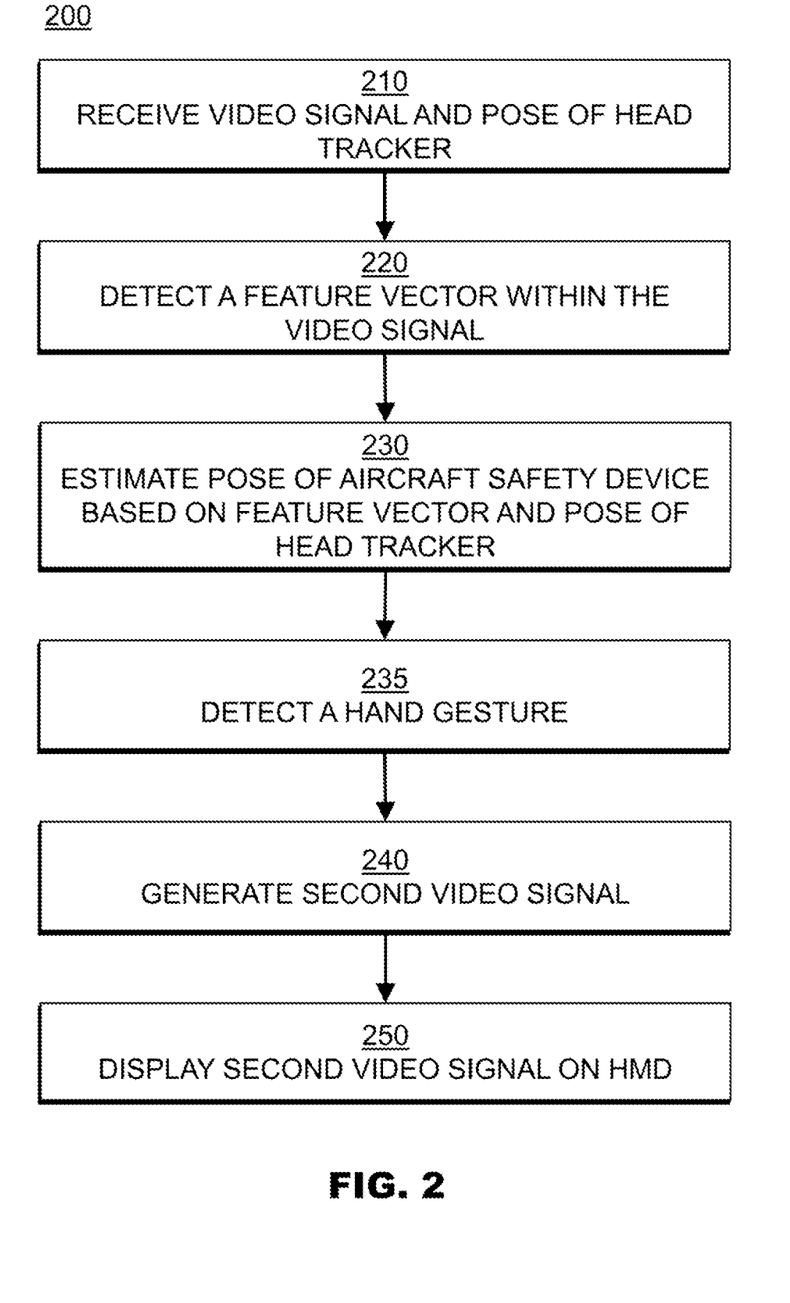
FIG. 2 depicts a flow diagram of a method, in accordance with one or more embodiments of the present disclosure.

Referring now to FIG. 2, a method 200 is described, in accordance with one or more embodiments of the present disclosure. The embodiments and the enabling technology described previously herein in the context of the aircraft system 100 should be interpreted to extend to the method 200. It is further recognized, however, that the method 200 is not limited to the aircraft system 100. Similarly, the embodiments and enabling technology of the method 200 should be interpreted to be implemented by the processors of the aircraft system 100.

In a step 210, video signals and pose information are received. The video signal and pose information may be received from a head-mounted display by way an avionics network. For example, the video signals may be received from a camera of the head-mounted display. By way of another example, the pose information may be received from a head tracker of the head-mounted display. Such video signal and pose information may be received by a controller including one or more processors, for processing purposes. The head-mounted display may be disposed within an aircraft environment, such as, but not limited to, an aircraft seating group or otherwise within an aisle of a passenger seating portion of an aircraft, of which a number of aisles and aircraft seating groups are known in the art. The video signal may include one or more images. The images taken by the camera may be in the form of a two-dimensional projection plane of the real world. In this regard, the images may capture a portion of the environment. Such portion captured within the images may be based, at least in part, on the field of view of the camera. Characteristics of the camera, such as focal length and lens curvature, together with position, viewing direction, or pose information may be associated with each image of the video signal. In this regard, the pose information may be determined at a rate at least equal to the frame speed capture rate of the camera.

In a step 220, a feature vector is detected within the video signal. The feature vector is detected by digital image processing the video signal. For example, the digital image processing may include using a feature detector algorithm on the video signal. The feature detector algorithm may include any feature detector algorithm known in the art, such as, but not limited to, a speeded up robust features (SURF) method or a scale invariant feature transform (SIFT) method. Such detection may be in the form of a semi-marker less mixed reality system which detects feature vectors for each frame or image of the video signal. Where the SURF method is used, the image may be described using one or more descriptors generated which are invariant to rotation and camera distance to the aircraft safety device.

The feature vector detected within the video signal may include one or more features. The features may include, but is not limited to, a feature corresponding to an aircraft safety device. Such aircraft safety device may include one or more of a life preserver stowage, an oxygen mask passenger service unit, a seatbelt, a fasten seatbelt sign, an emergency exit door, or the like. The features detected may include various information associated with the aircraft safety device, such as, but not limited to one or more of points, edges, lines, planar surfaces, or textures. By the feature vector, the various aircraft safety devices may be detected within the environment using the video signal of the images.

In a step 230, a pose of the aircraft safety device detected within the first video signal may be estimated. The pose of the aircraft safety device may be estimated based on the feature vector including the one or more features associated with the aircraft safety device. The pose of the aircraft safety device may also be estimated based on the pose information from the head tracker. The pose of the aircraft safety device may be estimated in any suitable fashion, such as, but not limited to, by calculating a transformation matrix. The transformation matrix may include a placement of the aircraft safety device in a three-dimensional space. The transformation matrix may be calculated based on the pose information from the head tracker together with the features associated with the aircraft safety device included in the feature vector.

In an optional step 235, one or more hand gestures are detected within the first video signal. Such hand gestures may be recognized in any manner known in the art, such as, but not limited to, by applying a hand tracking and segmentation (HTS) algorithm to the first video signal. For example, the hand gestures may include a static gesture recognition. The static gesture recognition may include one or more steps by which a hand gesture is recognized. The hand may be tracked across multiple images by various hand tracking technology, such as, but not limited to, a depth sensor or an infrared camera. A hand posture may be determined from the multiple images. Images of the hand may then be segmented into multiple segments and processed for determining edges of the hand. A gesture may then be determined based on the edges of the hand by a comparison of the edges to various edges and associated hand gestures stored in memory. The detected hand gesture may then be used to execute a command. For example, the detected hand gesture may include pointing to the aircraft safety device in the environment.

In a step 240, a second video signal is generated. The second video signal may correspond to the aircraft environment. In this regard, the second video signal may include the video signal received from the camera composited together with one or more virtual objects. The virtual object may be composited with the second video signal by any graphics rendering software, such as, but not limited to, OpenGL. The graphics rendering software may use a model of the virtual object to selectively orient the virtual object within the second video signal. The virtual objects may be composited with the first video signal using a select position and orientation, such that the virtual object is selectively positioned within the second video signal. In particular, the pose of the virtual object within the second video signal may be selected based on the perspective of the head-mounted display. Providing the virtual objects from the perspective of the user is believed to improve a passenger engagement and retention of information, which is critical during emergency situations. The virtual object may also be selectively positioned relative to the associated aircraft safety device. For example, the virtual object may be placed near, next to, or on the associated real-world location of the aircraft safety device within the signal. Thus, the virtual object may be posed within the second signal based on one or more of the poses of the head tracker, the estimated pose of the aircraft safety device, and the model of the virtual object stored in a memory.

In some embodiments, the virtual objects are composited with the first video signal in response to detecting the feature vector within the video signal. In this regard, the second video signal may be generated automatically. In some embodiments, the virtual objects are composited with the first video signal in response to detecting a hand gesture selecting the aircraft safety device. In this regard, the second video signal may be generated in response to a user input. As may be understood, the first video signal may be provided to the display of the HMD until such time as the hand gesture is detected.

The one or more virtual objects composited with the first video signal may correspond to a safety instruction, such as, but not limited to, a pre-flight safety briefing, a pre-flight demonstration, an in-flight safety briefing, or various other aircraft safety instructions. The safety instruction may be associated with the aircraft safety device identified within the video signal. In this regard, the safety instruction may show various information associated with the aircraft safety device, such as, but not limited to, a name of the aircraft safety device, a location of the aircraft safety device (e.g., by highlighting the aircraft safety device, point to the aircraft safety device, etc.), a visual representation of operating the safety device according to various procedures, or the like.

The procedures may show the operation of the aircraft safety device using the virtual object. For example, such procedure may include a life preserver procedure. The life preserver procedure may include one or more of a virtual representation of operating the life preserver stowage, a life preserver (e.g., a life vest, life raft) being removed from life preserver stowage, inflating the life preserver, and attaching the life preserver to a body of the person wearing the head-mounted display. By way of another example, such procedure may include an oxygen mask procedure. The oxygen mask procedure may include one or more of a virtual representation of operating the oxygen passenger service unit, an oxygen mask being deployed from the oxygen passenger service unit, and attaching the oxygen mask to the head of the person wearing the head-mounted display. By way of another example, such procedure may include a fasten seatbelt procedure. The fasten seatbelt procedure may include one or more of displaying a light on the fasten seatbelt sign and a virtual representation of operating the seatbelt securing the user of the head-mounted display to the aircraft seat. By way of another example, such procedure may include an emergency exit door procedure. The emergency exit door procedure may include one or more of displaying a virtual representation of operating the emergency exit door (e.g., pulling a handle of the door), a light of an exit sign, a light of one or more floor lighting, or a deployment of an evacuation slide. It is further contemplated that various additional flight safety procedures may be composited with the appropriate and associated aircraft safety device for virtually displaying flight safety instructions.

As may be understood, the specific examples of the aircraft safety devices, feature vectors, virtual objectors, or procedures are not intended to be limiting. In particular, the aircraft safety devices, feature vectors, virtual objectors, and procedures may vary between flight and types of aircrafts. Thus, the method 200 may be customized based on the flight or aircraft.

In a step 250, the second video signal is displayed on a display of a head-mounted display. Displaying the second video signal may include generating imagery on the display representative of both the first video signal and the virtual object placed within the first video signal, in the form of a video-see through reality. Displaying the second video signal may also include generating various auditory sounds by a speaker of the display. The auditory sounds may correspond to a voice describing the various procedures or an exemplary sound associated with the aircraft safety device (e.g., a fasten seatbelt noise). By displaying the second video signal, the passenger using the head-mounted display may understand and visualize the safety features. Furthermore, such visualization may occur from the perspective of the user. In particular, the user may be able to view the safety features without regard to a height of the user, as opposed to an in-person demonstration by the flight attendant which may be obscured by seating or other passengers. Additionally, the passenger may retrieve previously displayed safety demonstrations, to improve comprehension, in cases where a safety feature was not understood.

One or more steps may then be iteratively performed to continue displaying video in near-real time. For example, step 210 through step 250 may be iterated.

Although not depicted, the method 200 may further include receiving a passenger language from an avionics network (e.g., from passenger database by way of the avionics network). The passenger language may indicate a native language of the passenger wearing the head-mounted display. The auditory sounds output by the display of the head-mounted display may be selected from memory based on the passenger language received from the avionics network. In this regard, various flight safety information may be provided to the user in the preferred language.

Although not depicted, the method 200 may further include receiving an infotainment signal from an avionics network. The infotainment signal may include various information or entertainment, such as, but not limited to an in-flight movie or television. The infotainment signal may be received from an aircraft entertainment system, or the like. In response to receiving the infotainment signal, the display of the head-mounted may be caused to display images and sound based on the infotainment signal. In some embodiments, the infotainment signal is provided to the head-mounted display in response to a selection by the passenger wearing the head-mounted display. For example, the passenger may select a movie or television from a list. The movie or television may be selected by way of a gesture-based interface (e.g., hand gesture recognition) with the HMD.

Figure 3A:
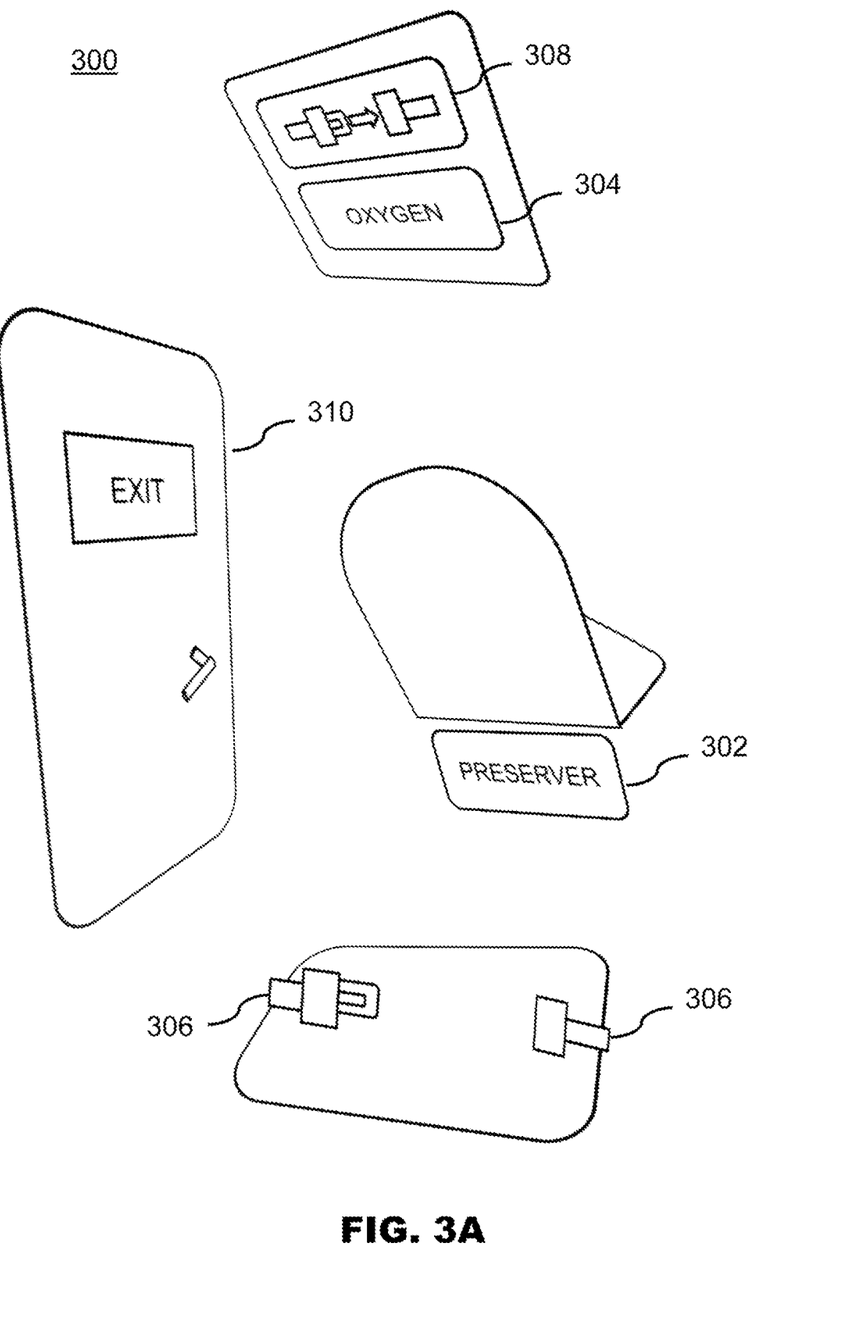
FIG. 3A depicts an exemplary frame of a video stream captured by a camera, in accordance with one or more embodiments of the present disclosure.
Figure 3B:
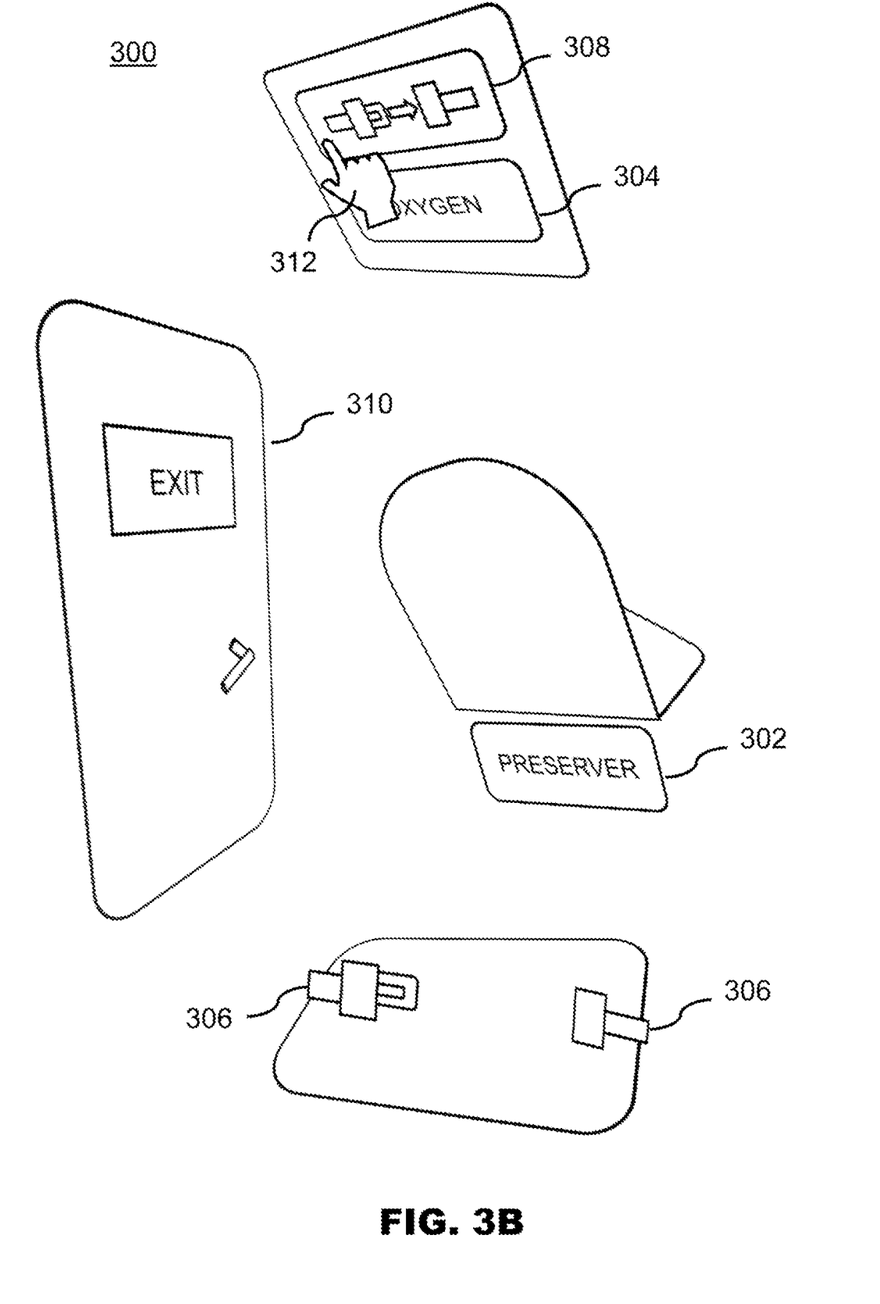
FIG. 3B depicts an exemplary frame of a video stream captured by a camera including a hand gesture selecting a fasten seatbelt sign, in accordance with one or more embodiments of the present disclosure.
Figure 3C:
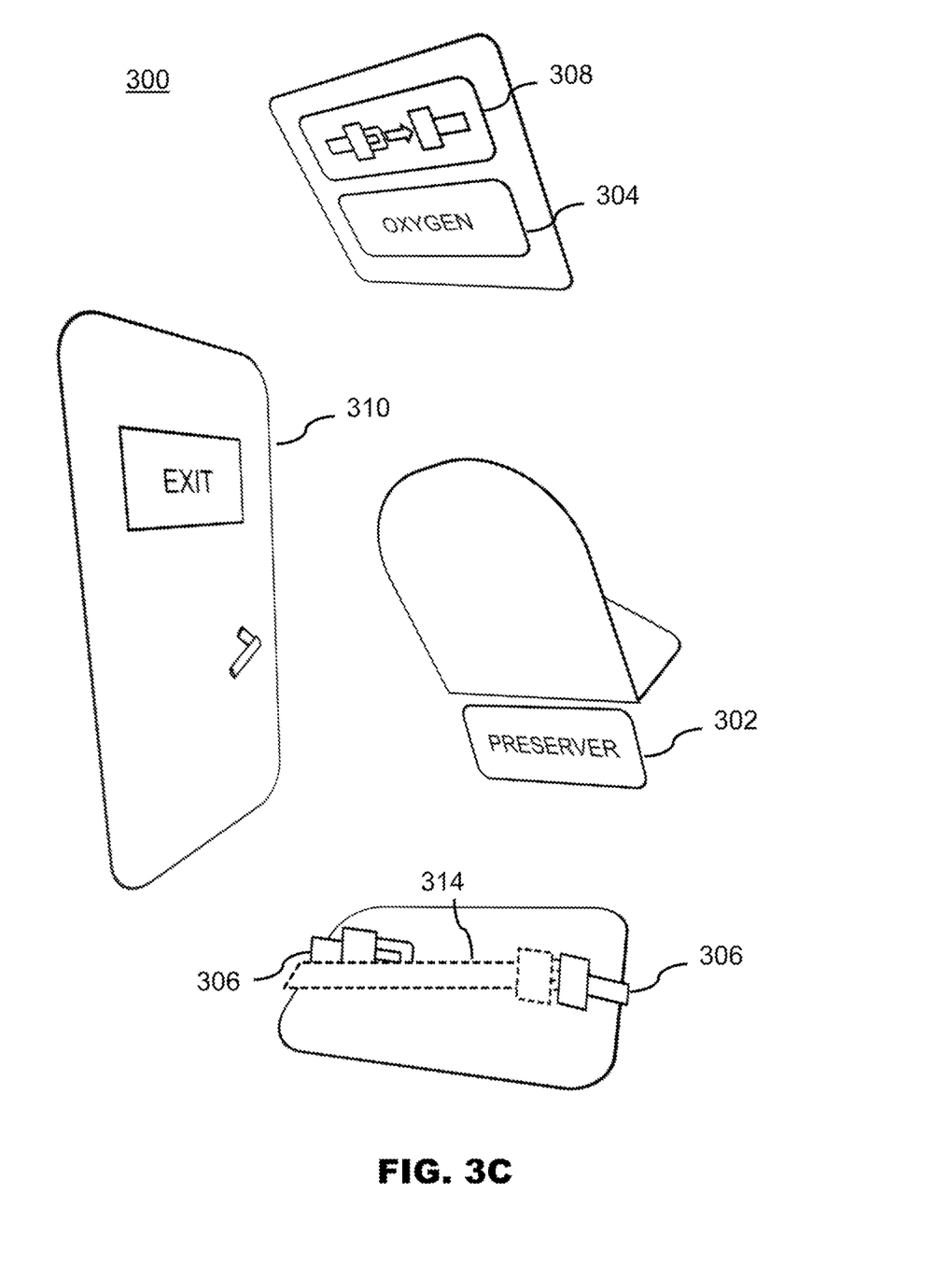
FIG. 3C depicts an exemplary frame of a video stream displayed to a head-mounted display including a virtual model of a seatbelt being fastened, in accordance with one or more embodiments of the present disclosure.

Referring now to FIGS. 3A-3C an aircraft environment 300 is described, in accordance with one or more embodiments of the present disclosure. The aircraft environment 300 may be a graphical representation of the real environment viewable by a passenger sitting in the real environment. The aircraft environment 300 may include various aircraft safety devices, such as, but not limited to, a life preserver stowage 302, a life preserver (e.g., contained within the life preserver stowage), an oxygen mask passenger service unit 304, an oxygen mask (e.g., contained within the oxygen PSU), a seatbelt 306, a fasten seatbelt sign 308, or an emergency exit door 310. One or more of such aircraft safety devices may include features which are detectable by a feature detector, such as, but not limited to, points, edges, lines, planar surfaces, or textures. A hand gesture may be detected within a frame of a video stream pointing at or otherwise selecting one of the aircraft safety devices. For example, FIG. 3B depicts a hand 312 pointing at the fasten seatbelt sign 308. In response to detecting the hand gesture selecting the aircraft safety device (e.g., by feature vector detection and hand gesture detection), a safety instruction associated with the associated aircraft safety device may be retrieved from memory, composited over the frames of the video stream, and displayed to a head-mounted display. For example, FIG. 3C depicts a virtual model 314 of a seatbelt which has been composited over the frame, said virtual model of the seatbelt being fastened. Although not depicted, the virtual model 314 may be composited over the legs of the passenger such that the passenger may see how to fasten the seatbelt 306 in response to the fasten seatbelt sign 308 being illuminated.

As may be understood, a number of virtual models may be composited in the aircraft environment 300, including any of the previously described flight safety procedures outlined in regards to the method 200. For example, the virtual models may include, but are not limited to, a life preserver model (e.g., the life preserver removed from life preserver stowage 302, attachment of the life preserver to the passenger body, inflating the life preserver, etc.), an oxygen mask model (e.g., the oxygen mask deploying from the oxygen passenger service unit 304, attaching the oxygen mask to the passenger head, etc.), an emergency exit door model (e.g., engaging a handle of the emergency exit door), an evacuation slide (e.g., composited over the emergency exit door subsequent to the handle being virtually engaged), and the like.

Referring generally again to FIGS. 1-3C.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s) described herein. In addition, each of the embodiments of the method described above may be performed by any of the systems described herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

We claim:

1. A computer-implemented method comprising:
   receiving a first video signal and pose information; wherein the first video signal is received from a camera of a head-mounted display within an aircraft environment, the first video signal corresponding to images captured of the aircraft environment; wherein the pose information is received from a head tracker of the head-mounted display; wherein the first video signal and the pose information are received by way of an avionics network;
   detecting a feature vector within the first video signal by digital image processing the first video signal using a feature detector algorithm, the feature vector including at least a first feature, the first feature corresponding to an aircraft safety device, the aircraft safety device including one of a life preserver stowage, an oxygen mask passenger service unit, a seatbelt, or an emergency exit door;
   estimating a pose of the aircraft safety device within the first video signal based on the feature vector together with the pose information from the head tracker;

generating a second video signal of the aircraft environment, the second video signal including the first video signal and one or more virtual objects composited with the first video signal, the one or more virtual objects corresponding to a safety instruction associated with the aircraft safety device, the one or more virtual objects positioned and oriented within the second video signal from a perspective of the head-mounted display based on the pose of the aircraft safety device; and causing a display of the head-mounted display to display the second video signal.

2. The computer-implemented method of claim 1, wherein the first feature includes one or more edges associated with the aircraft safety device.

3. The computer-implemented method of claim 2, wherein the feature detector algorithm comprises a speeded up robust features (SURF) method.

4. The computer-implemented method of claim 1, wherein the pose of the aircraft safety device within the first video signal is estimated by calculating a transformation matrix based on the pose information from the head tracker together with the first feature associated with the aircraft safety device included in the feature vector.

5. The computer-implemented method of claim 1, wherein the aircraft safety device comprises the life preserver stowage; wherein the safety instruction displayed by the head-mounted display includes a life preserver procedure; wherein the life preserver procedure includes displaying a virtual representation of operating the life preserver stowage.

6. The computer-implemented method of claim 1, wherein the aircraft safety device comprises the oxygen passenger service unit, wherein the safety instruction displayed by the head-mounted display includes an oxygen mask procedure; wherein the oxygen mask procedure includes displaying a virtual representation of operating the oxygen mask passenger service unit.

7. The computer-implemented method of claim 1, wherein the aircraft safety device comprises the seatbelt; wherein the feature vector includes a second feature, the second feature including a fasten seatbelt sign; wherein the safety instruction displayed by the head-mounted display includes a fasten seatbelt procedure, wherein the fasten seatbelt procedure includes displaying a light on the fasten seatbelt sign and a virtual representation of operating the seatbelt.

8. The computer-implemented method of claim 1, wherein the aircraft safety device comprises the emergency exit door; wherein the safety instruction displayed by the head-mounted display includes an emergency exit door procedure, wherein the emergency exit door procedure includes displaying a virtual representation of operating the emergency exit door.

9. The computer-implemented method of claim 1, further comprising receiving a passenger language from the avionics network, wherein the second video signal includes an auditory sound output by the head-mounted display, wherein the auditory sound is selected from memory based on the passenger language.

10. The computer-implemented method of claim 1, further comprising receiving an infotainment signal from the avionics network and causing the display of the head-mounted display to display imagery based on the infotainment signal.

11. The computer-implemented method of claim 1, further comprising recognizing a gesture of a hand within the first video signal, wherein the gesture comprises pointing to the aircraft safety device, wherein the second video signal of the aircraft environment is generated in response to recognizing the gesture.

12. The computer-implemented method of claim 11, wherein the gesture of the hand within the first video signal is recognized by applying a hand tracking and segmentation algorithm to the first video signal.

13. The computer-implemented method of claim 1, wherein the second video signal of the aircraft environment is generated in response to detecting the feature vector within the first video signal.

14. An aircraft system comprising:
a head-mounted display within an aircraft environment, the head-mounted display including;
a frame;
at least one camera fixed to the frame and configured to generate a first video signal corresponding to images captured of the aircraft environment;
a head tracker fixed to the frame and configured to generate pose information indicative of a position and orientation of the at least one camera;
a display fixed to the frame and configured to generate an image;
an avionics network; and
a processor communicatively coupled to the head-mounted display by the avionics network, the processor configured to execute program instructions maintained on a memory causing the processor to:
receive the first video signal and the pose information from the head-mounted display by way of the avionics network;
detect a feature vector within the first video signal by digital image processing the first video signal using a feature detector algorithm, the feature vector including at least a first feature corresponding to an aircraft safety device including one of a life preserver stowage, an oxygen mask passenger service unit, a seatbelt, or an emergency exit door;
estimate a pose of the aircraft safety device within the first video signal based on the feature vector together with the pose information from the head tracker;
generate a second video signal by compositing the first video signal with one or more virtual objects corresponding to a safety instruction associated with the aircraft safety device, the one or more virtual objects positioned and oriented within the second video signal from a perspective of the head-mounted display based on the pose of the aircraft safety device; and
cause the display of the head-mounted display to display the second video signal.

15. The aircraft system of claim 14, further comprising a line replaceable unit, the line replaceable unit including the processor.

* * * * *